May 7, 1968 P. M. RUBINS ET AL 3,381,522
EQUIPMENT TO MEASURE CHEMICAL REACTION KINETIC RATES OF
THE RECOMBINATION PROCESSES FOR GASEOUS REACTIONS
Filed June 15, 1966
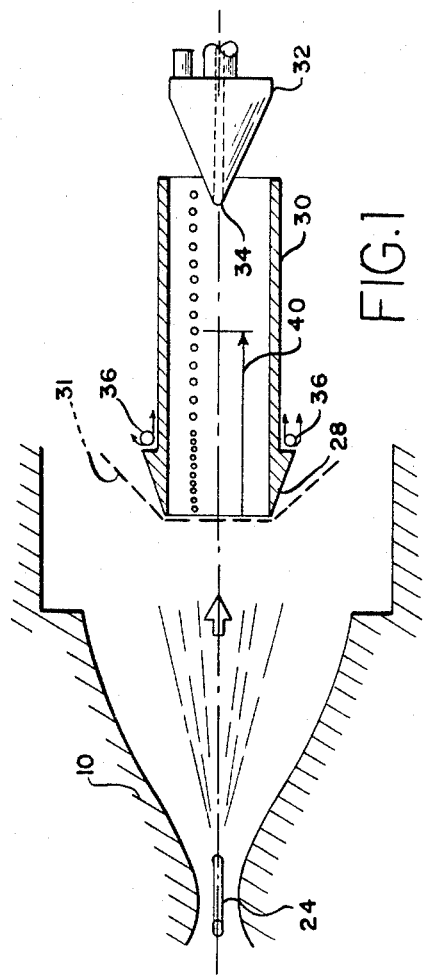
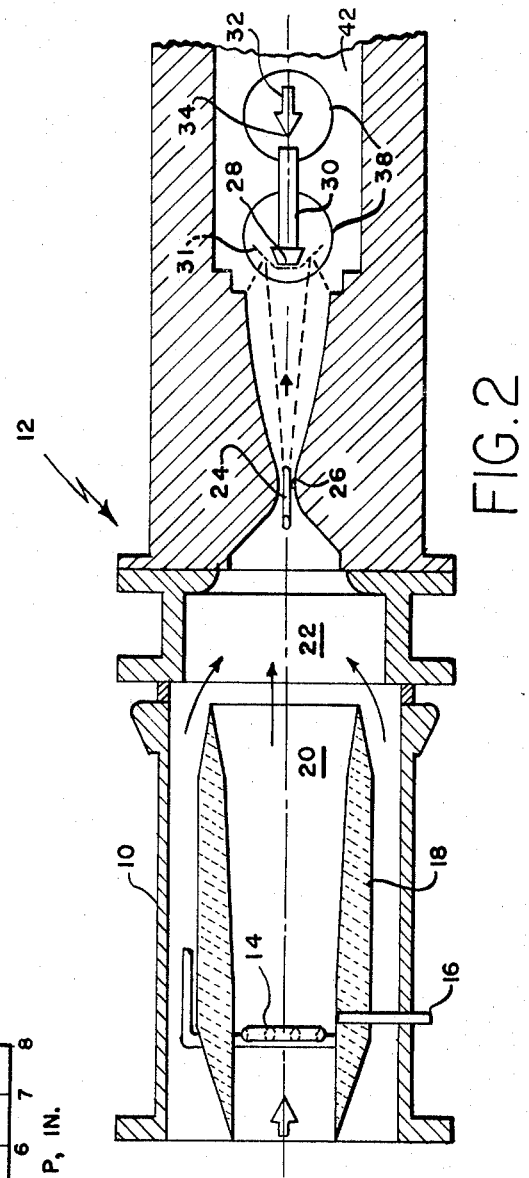
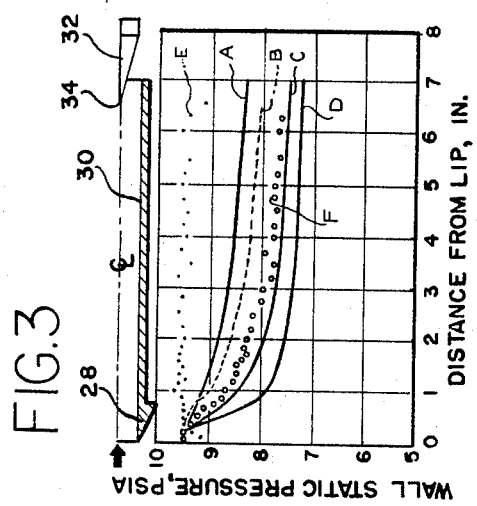
INVENTORS.
PHILIP M. RUBINS
THOMAS H.M. CUNNINGHAM
BY Harry A. Herbert Jr.
and
ATTORNEYS United States Patent Office 3,381,522
Patented May 7, 1968

3,381,522
EQUIPMENT TO MEASURE CHEMICAL REACTION KINETIC RATES OF THE RECOMBINATION PROCESSES FOR GASEOUS REACTIONS
Philip M. Rubins, Tullahoma, Tenn. (512 Spring St., Manchester, Conn. 06040), and Thomas H. M. Cunningham, 805 Lowry St., Manchester, Tenn. 37355
Filed June 15, 1966, Ser. No. 559,050
4 Claims. (Cl. 73—35)

ABSTRACT OF THE DISCLOSURE

A device for measuring chemical reaction rates comprising a combustion chamber connected to a reaction chamber. A high velocity hot gaseous mixture from the combustion chamber and a fuel are caused to pass over an open tube in the reaction chamber so as to produce a shock wave and an area of slowed down chemical reaction within the tube. Sensory means are mounted on the reaction chamber and tube to measure the chemical reaction rate within the reaction chamber.

The present invention relates to a device for measuring chemical reaction rates of the recombination processes for gaseous reactions and, more particularly, a sensor tube mounted downstream of the point of fuel injection for measuring kinetic energy.

In the past a knowledge of the detailed reaction chemistry of gases has been necessary for designing various types of high speed propulsion devices. This information has been obtained in the past by various means. Noteworthy among these is the shock tube method of reaction chemistry investigation. In this system, a shock wave travels through a combustible gas, and the gas properties are studied downstream of the shock by means of pressure transducers, spectroscopy, and interferometry. Some information can be obtained from these studies, such as rate of OH free radical formation for the $H_2$-air of $H_2$-$O_2$ reaction, and an indication of time to reach reaction completion.

However, there are three disadvantages to this method if reaction kinetic information is needed: (1) spectroscopic information is limited to the species which can be observed through spectroscopic means, (2) slight flow disturbances characteristic of shock waves and their interaction with walls can generate pulses which affect reaction kinetics markedly, and (3) pressure transducer measurements are generally not fast enough to record the peak pressure, its duration, and the pressure change characteristic of heat release.

A second method of determining reaction histories is by means of electronic computers. For the relatively simple $H_2$-air reaction, complicated computer programs exist which can calculate the progress of an $H_2$-air reaction to completion on a suitable machine in 3 to 10 minutes. A typical computation on an IBM 7094 machine includes approximately 160,000 simultaneous stepwise iterations. This method is dependent on the knowledge of reaction rate coefficients for selected known reactions, all of which must be determined by other experimental or theoretical means. In the case of the $H_2$-air reaction, there are eight forward and eight reverse reactions commonly accepted as important. If eight forward reaction rates are known, the eight reverse rates may be computed.

However, in the case of a more complicated, yet still relatively simple, fuel such as propane over thirty components are known to exist in the reactions, and over sixty equations are needed to describe the interaction of these components. To further complicate matters, there are insufficient data on the rates of the reactions so that estimated rates must be used. For fuels with a larger number of atoms, the computation will be still more complex.

The net result is that (1) chemical kinetic reaction progress for the simplest fuel reactions are relatively well established, but not quite accurate enough for high speed air propulsion combustion design, and (2) for more complicated fuels the determination of the reaction progress is, at best, an educated guess.

The object of the present invention is the provision of a continuous flow device for measuring pressure change in a chemically reacting gas from which calculations of heat release can be made and deductions made as to the rates of the chemical reactions, avoiding altogether the disadvantages presented by the two methods described above.

The need to minutely and accurately analyze tens to hundreds of simultaneous reactions, establish the rate of each, and perform a computer analysis to evaluate the overall rate of the reaction will be completely circumvented. It is presumed that information obtained will be useful to anyone concerned with reaction rate chemistry, including designers of combustion equipment, high speed aircraft engines, etc.

The present invention provides equipment for measuring the net effect of exothermic combustion. From the deductions possible in this method, descriptive equations can be written which will describe the resultant and effective reactions.

A further object of the invention is to provide a device whereby equations can be written which are descriptive of the overall combustion kinetics, and which can be used directly to design combustion chambers where the combustion is controlled by reaction kinetics, and air breathing propulsion devices such as supersonic combustion ram jets, thus rendering the complicated multi-reaction equations and their corresponding reaction rates unnecessary; and further for studying chemical reaction rates and kinetic histories and reaction effects for complicated gaseous fuels such as hydrocarbons about which little is known, and for which analytical determination is not possible by any other means at this time.

A further object of the invention is the provision of a device and method for controlled delaying of the ignition reaction in a combustion chamber so that the ignition delay zone may be studied.

A still further object of the invention is the provision of a device wherein the effect of chemical reaction can be observed, by controlling the rate of the recombination reaction and spreading pressure profiles. This is done by inserting a sensor tube into a continuous flowing high velocity reacting gas stream, and controlling the speeds of the chemical reactions so that they are relatively slow compared to the stream velocity, are "spread" along a flow axis and can be easily studied. Pressure changes generated by the reacting gas are transmitted to the walls of the tube and are measured there. The measured pressure profile is then used to infer the rate of heat release and degree of reaction completion. Thus, the determination of the fluid mechanical effect of reaction kinetics in a flowing stream does not depend on an analysis of many individual chemical reactions. In addition, a determination of the individual reaction rate for each reaction is not required.

A further object of the invention is the provision of a device as described above wherein steady state measurements can be made with manometer tubes, eliminating the necessity for high speed responding instruments.

A still further object of the invention is the provision of a device as above noted which is not affected by transverse oscillations which ordinarily interfere seriously with the reaction rates in shock tube measurements.

A further object of the invention is the provision of a device which can be used in a conventional wind tunnel where temperatures of the order of 2500° R. are obtainable.

These and other advantages, features and objects of the invention will become more apparent from the following description taken in connection with the illustrative embodiments in the accompanying drawings, wherein:

FIGURE 1 is a cross sectional view of a supersonic combustion tunnel with the standing wave shock tube installed therein;

FIGURE 2 is a detailed schematic view of the device of the invention installed; and FIGURE 3 is a graphic representation of a comparison of $H_2$-air chemical reaction pressure data with presently available computed pressure histories for selected reaction rates.

Referring more in detail to the drawings, the combustion section 10 of the tunnel 12 is provided with a fuel injector 14, spark plug means 16, and a prefactory preheater 18. These elements are of any suitable design.

Preheated air enters the tunnel at a maximum temperature of 1500° R. and is heated to higher temperatures of the order of 2400° R. by combustion of a suitable fuel injected into a preheated compartment or chamber 20 by the fuel injector 14, located upstream of the sensor or shock wave tube later described.

In analyzing the data of course, the products in the combustion chamber 22 must be taken into consideration. A fuel injector 24 is located in the restricted throat 26.

The lip 28 of the shock tube or sensor tube 30 encounters fluid flow of the order of Mach 3, and a standing shock wave 31 is created. The shock is maintained on the lip of the tube 30 by means of movable cone plug or valve element 32. The plug is provided at its tip with a duct opening 34 for procuring samples as desired.

The tube 30 is cooled by an expedient cooling means such as cooling coil 36. Pressure data (FIG. 3) are taken from pressure taps represented schematically at 40 (FIG. 3) and distributed along the length of the tube 30. A flow of high velocity reacting gas, and an area of slowed down chemical reaction is brought about in the tube 30, so that the effects of combustion can be spread along the flow axis and thus be more easily studied.

The space in which the reaction takes place and which contains tube 30 and valve 32 is designated as the reaction chamber 42.

The tube 30 is provided with a lip element 28 which influences the form of a standing shock wave 31 and must be located precisely so that the standing wave neither "spills over" the lip 28, nor retracts or is "swallowed" into the tube 30. In either event the progress of the chemical reaction in the tube will be interfered with, and no meaningful chemical reaction data can be obtained.

Windows 38 in the wall of reaction chamber 42 are provided for observation, and for photographing of shock waves.

It will thus be seen that the chemical reaction kinetic rates can be slowed down and spread out in the tube so that it is possible to observe them and take measurements. These measurements can be deduced from the pressure readings taken intermittently along the length of the tube, the proper corrections being of course made for heat transfer and viscous effect.

In FIGURE 3 there is shown a comparison of data obtained by the device of the invention and that obtained by computed data. The four plotted curves A, B, C and D indicate the present state of knowledge of reaction kinetics and computed pressure histories for relatively simple and well known reaction rates of hydrogen and air. The degree of divergence of the four curves is evident. The data[2] is an indication of this divergence. The line E represents pressure data collected by means of the device of the invention where air alone was used with no fuel. F represents pressure data also collected by the device of the invention where chemical reaction was produced by $H_2$-air. This data[2] shows the degree of preciseness achievable, and means that the device can be used to calculate reaction recombination rates for hydrogen air reactions. It also indicates that calculations are possible with regard to other more complicated fuels whose reaction rates are little known.

In a modification of the device (see FIGURE 1) the tube 30 is mounted in a supersonic flow of air. The air is preheated, and fuel is injected upstream of the tube at 24 and at high velocity so that the mixed gas is below ignition temperature. The gas flow entering the tube is regulated by means of an adjustable plug 32 at the tube exit to establish a normal shock at the tube entry. Upon passing through the shock, the mixture temperature is raised above ignition temperature and the mixture starts to react. The reacting gas liberates heat, and this heat addition affects the stream pressure. An analysis of the stream pressure can be made, include effect of boundary layer and wall heat transfer. Deductions can then be made concerning the ignition delay time and the recombination history, or the time to reach a desired percentage of recombination (i.e., 90 percent).

The operation and the advantages of the invention will now be evident.

Although the invention has been described with reference to a particular embodiment, it will be understood to those skilled in the art that the invention is capable of a variety of alternative embodiments within the spirit and scope of the appended claims.

We claim:

1. A device for measuring chemical reaction rates comprising a combustion chamber for preheating air to a high temperature and high velocity, means for conducting said air from said combustion chamber to a reaction chamber, means located within said conducting means for injecting fuel into said high temperature high velocity air so as to produce a high velocity gaseous mixture below ignition temperature, a tube member having an entry and exit located in the reaction chamber and in the mainstream of said gaseous mixture, a lip at the entry of said tube where a standing shock wave is generated due to the impact of said high velocity gaseous mixture prior to subsequent ignition and reaction of said gaseous mixture after it passes said lip, an area of slowed down chemical reaction within the tube, means at the exit of said tube for regulating and maintaining the shock wave on the lip of the tube, and means positioned in and on said reaction chamber for sensing and collecting data with regard to the chemical reaction taking place within said reaction chamber.

2. The device of claim 1 in which the means for sensing and collecting data comprises pressure taps and windows.

3. The device of claim 1 in which the means at the exit of the tube member is a valve.

4. The device of claim 3 in which cooling means are provided for the tube.

References Cited
UNITED STATES PATENTS 2,692,480  10/1954  Viaud et al. _____ 60—39.72
2,728,191  12/1955  Casey _____ 60—39.72

JAMES J. GILL, *Primary Examiner.*

R. S. SALZMAN, *Assistant Examiner.*